(12) United States Patent
Aldridge

(10) Patent No.: US 9,835,241 B2
(45) Date of Patent: Dec. 5, 2017

(54) SYSTEM AND PROCESS FOR REMOVING HARDENED LUBRICANT FROM AN ENCLOSED GEARBOX

(71) Applicant: Horizon Valve Services Inc., Hominy, OK (US)

(72) Inventor: Roy A. Aldridge, Cleveland, OK (US)

(73) Assignee: Horizon Value Services, Inc., Hominy, OK (US)

( * ) Notice: Subject to any disclaimer, the term of this patent is extended or adjusted under 35 U.S.C. 154(b) by 41 days.

(21) Appl. No.: 14/806,821

(22) Filed: Jul. 23, 2015

(65) Prior Publication Data

US 2016/0025204 A1    Jan. 28, 2016

Related U.S. Application Data

(60) Provisional application No. 62/027,961, filed on Jul. 23, 2014.

(51) Int. Cl.
*F16H 57/04* (2010.01)
*B08B 3/04* (2006.01)

(52) U.S. Cl.
CPC ................. *F16H 57/0402* (2013.01)

(58) Field of Classification Search
CPC .............................. B08B 3/04; F16H 57/0402
See application file for complete search history.

(56) References Cited

U.S. PATENT DOCUMENTS

| | | | |
|---|---|---|---|
| 1,549,952 A * | 8/1925 | Anderson | F02B 77/04 134/169 A |
| 1,829,173 A * | 10/1931 | Wertz | B67D 7/845 134/168 R |
| 2,079,989 A | 2/1934 | Delano | |
| 2,236,784 A | 7/1938 | Taylor et al. | |
| 2,425,848 A * | 8/1947 | Vawter | B01D 25/00 134/107 |
| 3,274,789 A | 9/1966 | Mitchell | |
| 3,430,730 A * | 3/1969 | Kitajima | F01M 11/045 184/1.5 |

(Continued)

FOREIGN PATENT DOCUMENTS

JP    52064562    5/1977

*Primary Examiner* — Michael Barr
*Assistant Examiner* — Benjamin L Osterhout
(74) *Attorney, Agent, or Firm* — Crowe & Dunlevy, P.C.

(57) ABSTRACT

The invention relates to a system and process for removing hardened lubricant, contaminants and other debris from an enclosed gearbox of an actuator in the gas, oil, and power industries that allows the oil or gas pipeline to continue to operate uninterrupted during servicing. The system operates at a low pressure and includes two pumps: an upstream pump that pumps a non-corrosive mineral oil-based cleaning agent into the gearbox; and a downstream pump that pulls off the pressure from within the gearbox as part of the circulation of the flush system. The system and process are further provided with a clean tank for storing an influent cleaning agent, a waste tank for storing an effluent cleaning agent, and a circulation tank used during the flush circulation process. The system and process may also include a rotatable mounting assembly that is secured to the gearbox of the actuator.

20 Claims, 5 Drawing Sheets

(56) References Cited

U.S. PATENT DOCUMENTS

| | | | | |
|---|---|---|---|---|
| 3,954,611 | A * | 5/1976 | Reedy | C10M 175/00 |
| | | | | 184/1.5 |
| 5,001,805 | A * | 3/1991 | Stouky | B08B 3/02 |
| | | | | 134/167 R |
| 5,005,437 | A | 4/1991 | Furer et al. | |
| 5,063,896 | A * | 11/1991 | Hyatt | F02B 77/04 |
| | | | | 123/198 A |
| 5,337,708 | A * | 8/1994 | Chen | B08B 3/04 |
| | | | | 123/198 A |
| 5,584,650 | A * | 12/1996 | Redmond | F04D 5/006 |
| | | | | 184/6.23 |
| 5,688,076 | A * | 11/1997 | Atkins | B01D 17/0205 |
| | | | | 166/267 |
| 7,510,662 | B1 * | 3/2009 | Hansen | F01P 11/06 |
| | | | | 134/102.2 |
| 7,987,946 | B2 | 8/2011 | Leite da Silva | |
| 2002/0084144 | A1 * | 7/2002 | Liao | F01M 11/0458 |
| | | | | 184/1.5 |
| 2006/0162751 | A1 * | 7/2006 | Llorente Gonzalez | F01M 11/04 |
| | | | | 134/169 A |
| 2006/0272900 | A1 | 12/2006 | Clyne | |
| 2014/0157955 | A1 * | 6/2014 | Walgren, Jr. | F16H 61/0021 |
| | | | | 74/733.1 |

* cited by examiner

SYSTEM AND PROCESS FOR REMOVING HARDENED LUBRICANT FROM AN ENCLOSED GEARBOX

CROSS REFERENCE TO RELATED APPLICATIONS

This application claims priority to and the benefit of U.S. Provisional Patent Application Ser. No. 62/027,961, filed Jul. 23, 2014, which is incorporated herein by reference in its entirety.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A SEQUENCE LISTING, A TABLE, OR A COMPUTER PROGRAM LISTING APPENDIX

Not Applicable.

BACKGROUND OF THE INVENTION

1. Field of the Invention

This invention relates generally to a system and process for removing hardened lubricant from an enclosed gearbox, and more particularly to a system and process for removing dried and hardened grease, contaminants and other debris from an enclosed gearbox of a valve actuator in the gas and oil industry.

2. Description of the Related Art

Grease must bleed oil to perform its lubrication role, and when grease becomes so dry, it loses its ability to release or bleed some of its oil during operation to properly lubricate a bearing in a gear box. Typical oil bleed rates of greases for bearing lubrication are about one percent (1%) to about five (5%) percent. For this reason a bleed rate, using the standard procedure DIN 51817, of >1% is generally required; if the grease bleeds excessively, such as in excess of about six percent (6%), the grease lubrication life will be short.

There are a large number of electrical valve actuators, in particular Limitorque®, that have been in the gas and oil industry in operation since the 1950's and the grease inside the gearboxes has solidified. In order to clean the solidified grease from the enclosed gearboxes, the actuators must be taken offline and manually serviced. Downtime is the oil and gas industry's number one enemy. In an environment where equipment is expected to run 24 hours a day, 7 days a week under extreme conditions, downtime caused by equipment failure can quickly affect a company's economic health based on the loss or reduction of production, excess man-hours expended to correct the problem, and possibly replacing the failed equipment with new.

It is therefore desirable to provide a system and process for removing hardened lubricant from an enclosed gearbox of a valve actuator in the gas and oil industry.

It is further desirable to provide a system and process that allows an oil or gas pipeline to continue to operate uninterrupted while the gearbox of the actuator is cleaned of grease, contaminants and other debris in order to place new grease within the gearbox without taking the valve offline.

It is still further desirable to provide a system and process for removing hardened lubricant from an enclosed gearbox of an electrical valve actuator that revives and prolongs the life of the actuator and that greatly reduces equipment failures before they occur.

It is yet further desirable to provide a system and process that utilizes an upstream pump to inject a cleaning agent under pressure in order to break down the grease without causing damage to the gearbox or its parts or causing danger by inhalation, fire, toxicity, etc. in conjunction with a downstream pump to remove the cleaning agent, lubricant, contaminants and other debris, along with minimizing the pressure within the gearbox as part of the circulation process of the flush system.

It is still yet further desirable to provide a system and process that utilizes a rotatable mounting assembly attachable to the gearbox for systematic flushing of lubricant, contaminants and other debris from the valve actuator.

Other advantages and features of the invention will be apparent from the following description and from the claims.

BRIEF SUMMARY OF THE INVENTION

In general, in a first aspect, the invention relates to a system for removing hardened lubricant from an enclosed gearbox of an actuator. The system includes a clean tank for storing an influent of a cleaning agent, a waste tank for storing an effluent of the cleaning agent and a circulation tank in fluid communication with the clean tank and the waste tank. The clean tank is positioned within an upstream flow path of the system, the waste tank is positioned within a downstream flow path of the system, and the circulation tank is position within a midstream flow path of the system. An upstream pump is in fluid communication with the circulation tank and is positioned within the midstream flow path of the system. The upstream pump, such as an electrically powered centrifugal pump, forces the cleaning agent from the circulation tank into the gearbox A downstream pump is in fluid communication with the circulation tank and is positioned within the midstream flow path of the system. The downstream pump, such as a pneumatic diaphragm pump, forces the cleaning agent from within the gearbox to the circulation tank or the waste tank. In addition, the system includes a compressor in fluid communication with the clean tank, the waste tank and the circulation tank. A plurality of relief valves may be in fluid communication with the compressor.

In addition, the system can be provided with an upstream valve member positioned within the upstream flow path in fluid communication with the clean tank and the circulation tank. A midstream valve member may be position within the midstream flow path of the system, and in fluid communication with the circulation tank. A downstream valve member may be provided within the downstream flow path in fluid communication with the waste tank of the system. Moreover, the clean tank and/or the waste tank may be provided with a liquid level tank gauge, while the circulation tank may be provided with at least one heating element to heat the cleaning agent to a predetermined workable temperature. An input hose can fluidly connect the circulating tank along the midstream flow path to the gearbox, and an output hose can fluidly connect the gearbox to either the circulating tank along the midstream flow path or the waste tank along the downstream flow path.

The system can also be provided with a rotatable mounting assembly constructed to be secured to the gearbox of the actuator. The rotatable mounting assembly can be constructed with a mounting plate constructed to be secured to the gearbox and a rotating plate in sealed engagement with the mounting plate. The rotating plate is constructed to be placed in sealed engagement with the gearbox. The mounting plate can include a generally cylindrical internal sealing shoulder and a cylindrical internal sealing surface. The rotating plate may have an annular sealing element positioned within a circular seal groove defined in an outer periphery of an axially extending circular sealing projection of the rotating plate. The rotating plate is sealed with respect to the mounting plate by the seal assembly of the rotating plate. Additionally, the rotating plate can have an internal circular sealing element positioned within a circular seal groove on an internal sealing face of the rotating plate. The internal circular sealing element of the rotating plate is constructed to establish sealing engagement with a drive nut of the gearbox. The rotatable mounting assembly may be also provided with a retainer element for maintaining sealing engagement between the rotating plate and the mounting plate during rotation of the rotating plate. The rotating plate includes an inlet flow port in fluid communication with the circulating tank along the midstream flow path to the gearbox. At least one spray nozzle is in fluid communication with the inlet flow port of the rotating plate for injecting the cleaning agent at a high velocity to achieve a turbulent flow within the gearbox.

In general, in a second aspect, the invention relates to a process for removing hardened lubricant from an enclosed gearbox of an actuator using the system described herein.

DETAILED DESCRIPTION OF THE INVENTION

Figure 1:
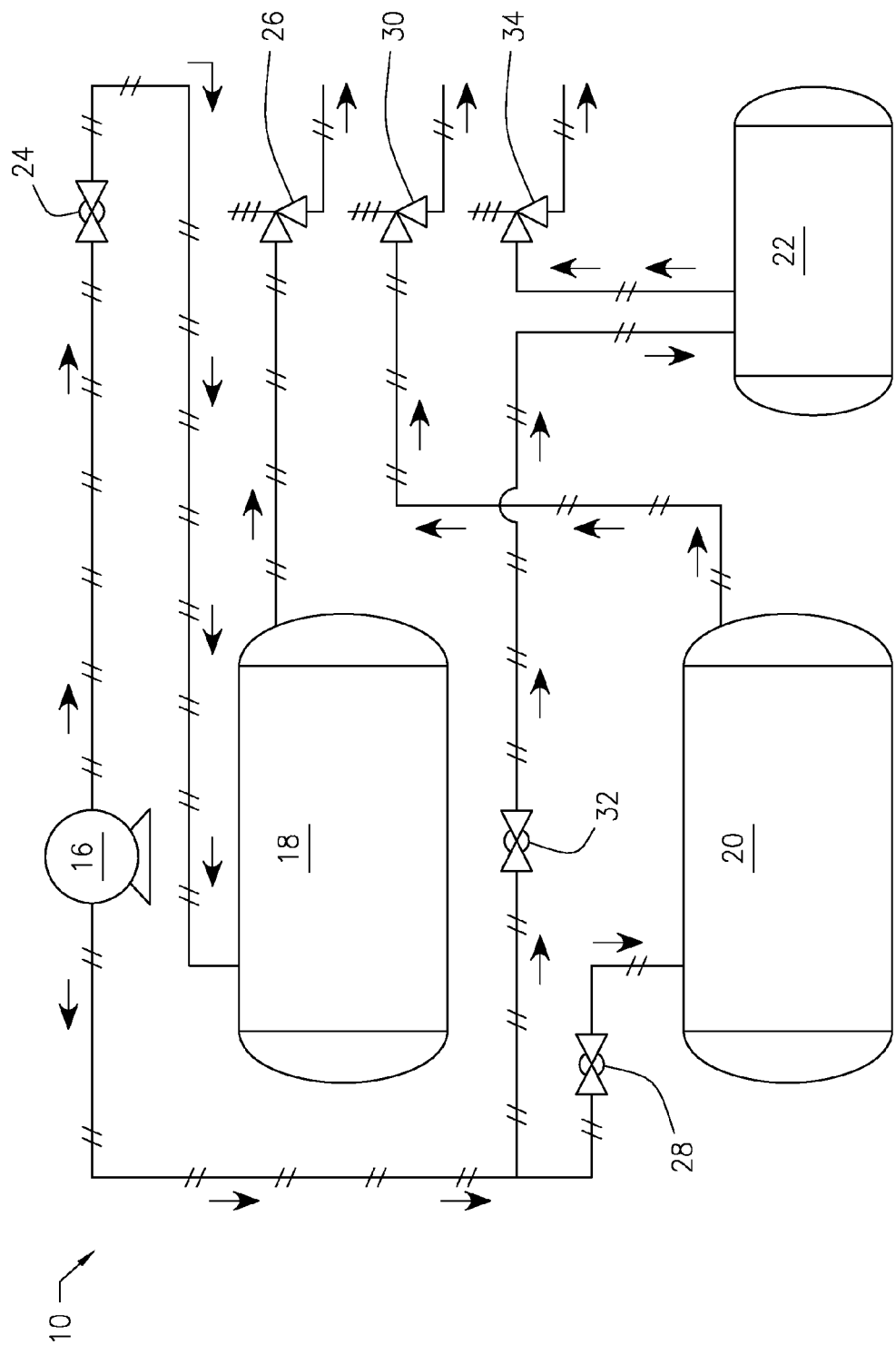
FIG. 1 is a piping and instrument diagram (P&ID) illustrating an example pneumatic flow in accordance with an illustrative embodiment of the system and process for removing hardened lubricant from an enclosed gearbox disclosed herein.

The systems and processes discussed herein are merely illustrative of specific manners in which to make and use this invention and are not to be interpreted as limiting in scope.

While the invention has been described with a certain degree of particularity, it is to be noted that many modifications may be made in the details of the construction and the arrangement of the devices and components of the systems and/or in the sequences and steps of the processes without departing from the scope of this disclosure. It is understood that the systems and processes are not limited to the embodiments set forth herein for purposes of exemplification.

The description of the invention is intended to be read in connection with the accompanying drawings, which are to be considered part of the entire written description of this invention. In the description, relative terms such as "front," "rear," "lower," "upper," "horizontal," "vertical," "above," "below," "up," "down," "top" and "bottom" as well as derivatives thereof (e.g., "horizontally," "downwardly," "upwardly" etc.) should be construed to refer to the orientation as then described or as shown in the drawings under discussion. These relative terms are for convenience of description and do not require that the machine be constructed or the process to be operated in a particular orientation. Terms, such as "connected," "connecting," "attached," "attaching," "join" and "joining" are used interchangeably and refer to one structure or surface being secured to another structure or surface or integrally fabricated in one piece.

In general, the invention relates to a system and process for removing hardened lubricant from an enclosed gearbox of an electrical valve actuator in the gas, oil, and power industries in order to replace with new lubricant. The system and process break down the old hardened lubricant in the enclosed gearbox and completely removes it, allowing the gas or oil pipeline to continue to operate uninterrupted while the gearbox of the actuator is cleaned of the ineffective lubricant and contaminants from minute worn parts. In addition to hardened lubricants from aging actuators in the oil and gas field, the system and process can be utilized to remove sand and other debris from the gearbox of the actuator located in sandy fields common in desert environments. The system operates at a low pressure, generally about one (1) to three (3) pounds per inch of pressure, and generally includes two pumps: an upstream pump that pumps a non-corrosive mineral oil-based cleaning agent into the gearbox; and a downstream pump that pulls off the pressure from within the gearbox as part of the circulation of the flush system. If the pressure of the system and process is too high, namely over about forty (40) pounds per inch of pressure, the lower seal to the gearbox of the actuator can be damaged and fail. As such, the system and process operate at a low pressure, generally about one (1) to about three (3) pounds per inch of pressure, thereby eliminating any damage to the lower seal of the actuator.

In addition, the system may be mounted on a mobile unit in order to access hard to reach gearboxes, such as in a gas or power plant that requires a skid or mobile unit able to fit on elevators or in an oil or gas field, pipeline exchange or storage hub. The system and process for removing hardened lubricants can be a self-contained system that is automated with sensing capabilities for taking lubricant measurements or the like. Moreover, the system and process disclosed herein can be implemented using a "smart application"-type software, allowing the system and process to be operated remotely by a tablet or smart phone. For example, the system and process may use a 64-bit processor and may include a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device. The system and remote computer may be connected via a suitable network connection, such as a T1 line, a common local area network ("LAN") connection, virtual private network connection or other network connection for computing devices. A data storage unit, such as serial flash memory, permits storage of audio files, data files, service records and other information. In addition, the system and process could utilize an application program that is resident on and run by a handheld, portable electronic device, such as a cell phone platform, for example Blackberry®, iPhone® or other smart phone electronic device or personal digital assistant ("PDA").

Referring now to the figures of the drawings, wherein like numerals of reference designate like elements throughout the several views, a system and process 10 for removing hardened lubricant from an enclosed gearbox 12 of a valve actuator 14. As exemplified in FIG. 1, the system and process 10 includes a compressor 16 in fluid communication with a waste tank 18, a clean tank 20 and a circulation tank 22 through a series of piping and valve members. Rather than utilizing compressed air or inert gases supplied by the compressor 16, the system and process 10 may utilize partial vacuum pressure supplied by a suitable pump (not shown) for moving fluids from the waste tank 18, the clean tank 20 and the circulation tank 22. The waste tank 18 is fluidly coupled at an upstream side to a waste tank pressure valve 24, which is fluidly coupled of the compressor 16. The waste tank 18 is also fluidly coupled at a downstream side to a waste tank pressure relief valve 26 for releasing excess pressure from the waste tank 18 of the system 10 to the environment. The clean tank 20 is fluidly coupled intermediate of a clean tank pressure valve 28 on an upstream side and a clean tank pressure relief valve 30 on a downstream side, and the clean tank pressure valve 28 is fluidly coupled to the compressor 16. Similarly, the circulation tank 22 is fluidly coupled to the compressor 16 on an upstream side using a circulation tank pressure valve 32 and is vented to the environment on a downstream side using a circulation tank relief valve 34.

Figure 2:
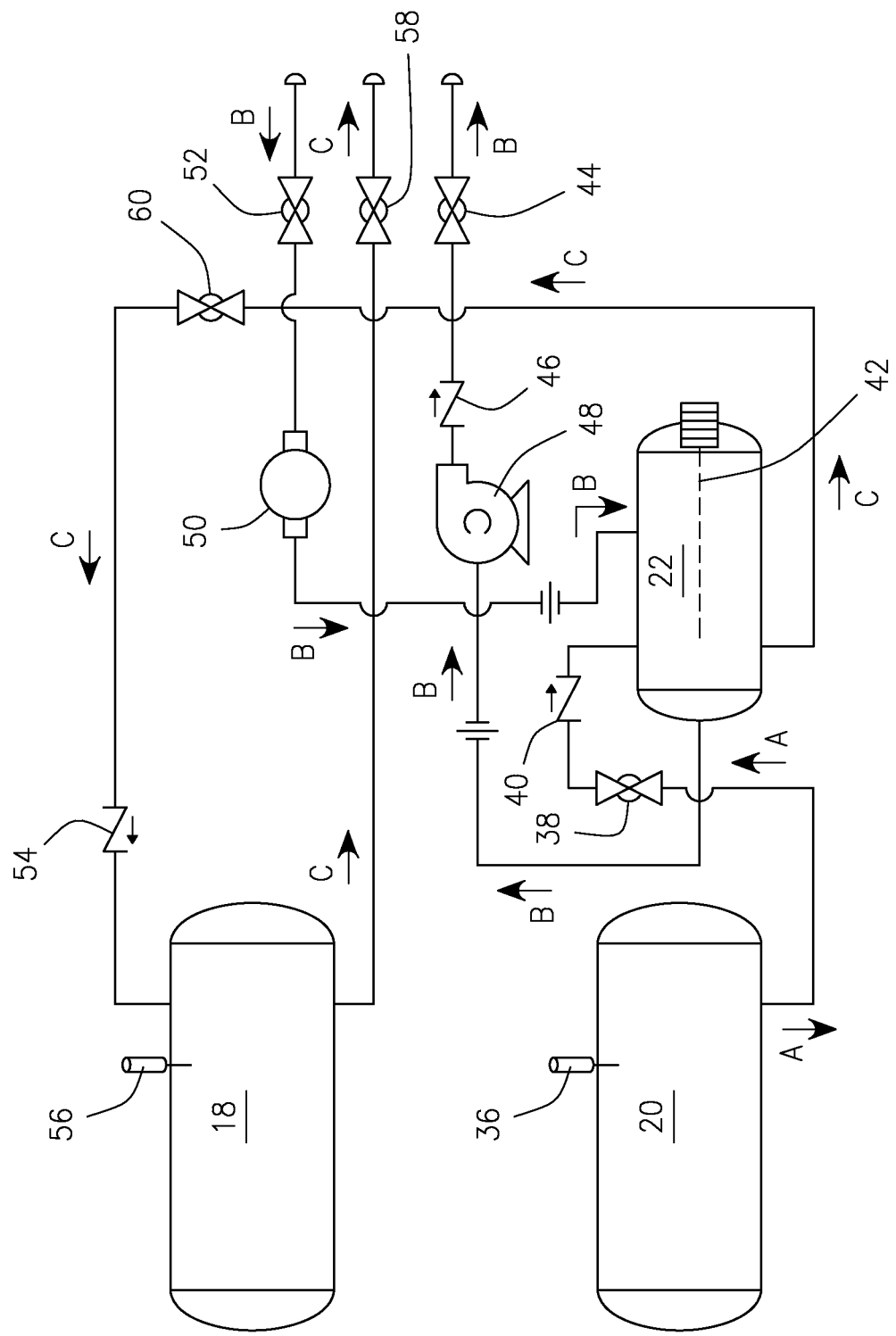
FIG. 2 is a P&ID illustrating an example fluid flow in accordance with an illustrative embodiment of the system and process for removing hardened lubricant from an enclosed gearbox disclosed herein.

FIG. 2 is a P&ID illustrating exemplary piping of the process fluid flow together with exemplary equipment and instrumentation of the system 10. The clean tank 20 includes a liquid level tank gauge 36 that measures the depth of the cleaning agent stored in the clean tank 20, and as illustrated, the cleaning agent used to flush the gearbox 12 is pumped from the clean tank 20 through an upstream flow path represented by arrows A having at least one upstream influent flow valve member, for example an upstream ball valve 38 and an upstream check valve 40 arranged in series, to the circulation tank 22. The circulation tank 22 includes at least one heating element 42 to heat the cleaning agent to a predetermined workable temperature, for example between about 150° F. to about 550° F., prior to being injected into the gearbox 12.

An upstream pump 48, such as an electrically powered centrifugal pump, forces the heated cleaning agent from the circulation tank 22 through a midstream circulation flow path represented by arrows B to at least one midstream influent flow valve member, for example a midstream ball valve 44 and a midstream check valve 46 arranged in series, to the gearbox 12. The cleaning agent is pulled through the gearbox 16 using a downstream pump 50, such as a pneumatic diaphragm pump, to flush the cleaning agent through the enclosed gearbox 12 of the actuator 14. From the gearbox 12, the cleaning agent may be recirculated along the midstream circulation flow path B to the circulation tank 22 where it can be reheated using the heating element 42 and pumped back to the gearbox 12. Once the flushing cycle is complete, the cleaning agent is pumped from the gearbox 12 through a downstream flow path represented by arrows C having a downstream effluent flow valve member, for example a downstream ball valve 52 and a downstream check valve 54 arranged in series, to the waste tank 18. The effluent cleaning agent, lubricant, contaminants and other debris flushed from the gearbox 12 can be stored in the waste tank 18, and the waste tank 18 may include a level tank gauge 56 that measures the depth of the effluent cleaning agent, contaminants and other debris stored in the clean tank 20. The effluent cleaning agent can be removed from the waste tank 18 by opening a waste tank valve member 58. The lubricant, contaminants and other debris can be filtered from the cleaning agent allowing the cleaning agent to be reused in the system and process 10. In addition, any cleaning agent within the circulation tank 22 can be pumped to along the downstream flow path C to the waste tank 18 through a circulation tank valve member 60.

The heated cleaning agent flows through the system and process 10 at a low pressure but is injected into the gearbox 12 at a high velocity to achieve a turbulent flow to remove old lubricant, contaminants and debris from the enclosed gearbox 12. By way of example, the cleaning agent may be heated to about 150° F. and then pumped from the circulation tank 22 to the gearbox 12 at a rate of about twenty-eight (28) gallons per minute using the upstream pump 48. The downstream pump 50 maintains the pressure within the gearbox 12 at about three (3) pounds per inch so as to not damage the lower seal of the actuator 14. Once flushed through the gearbox 12, the cleaning agent cools to about 110° F. and is pulled back to the circulation tank 22 or the waste tank 18 using the downstream pump 50 at a rate of about two (2) gallons per minute at about forty (40) pounds per inch of pressure.

Although the valve members of the system and process 10 in the PI&D of FIGS. 1 and 2 are illustrated as ball valves, relief valves and check valves, the invention is not so limited and other types of valves may be used, including but not limited to, gate valves, globe valves, solenoid valves, hydraulic valves, motor-operated valves, powered valves, butterfly valves, flap valves, or any other form of shut-off valves to control or stop the flow of the cleaning agent, air or gas through the piping of the system and process 10.

Figure 3:
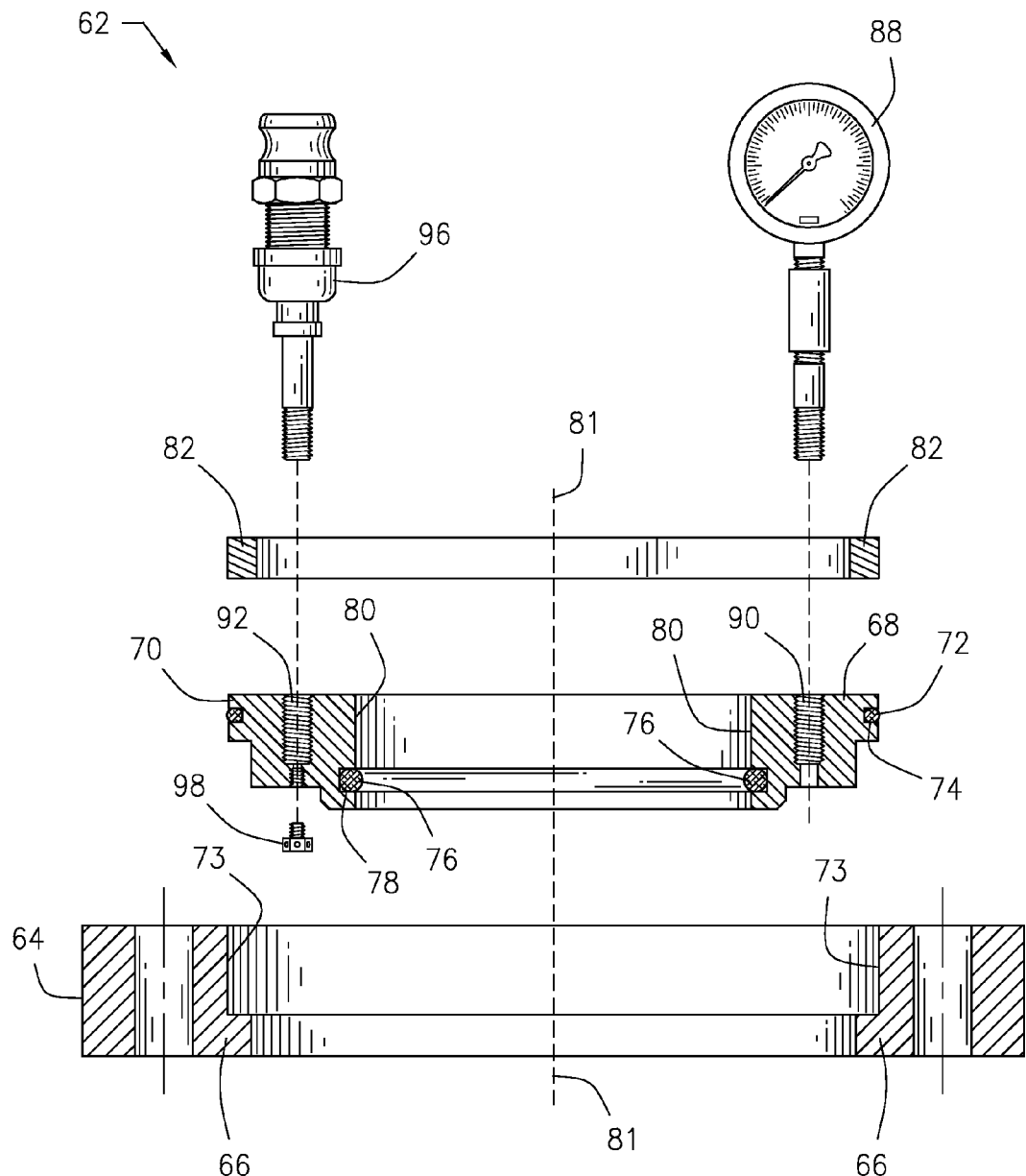
FIG. 3 is a perspective view of an example of a rotatable mounting assembly attached to the gearbox in accordance with an illustrative embodiment of the system and process for removing hardened lubricant from an enclosed gearbox disclosed herein.
Figure 4:
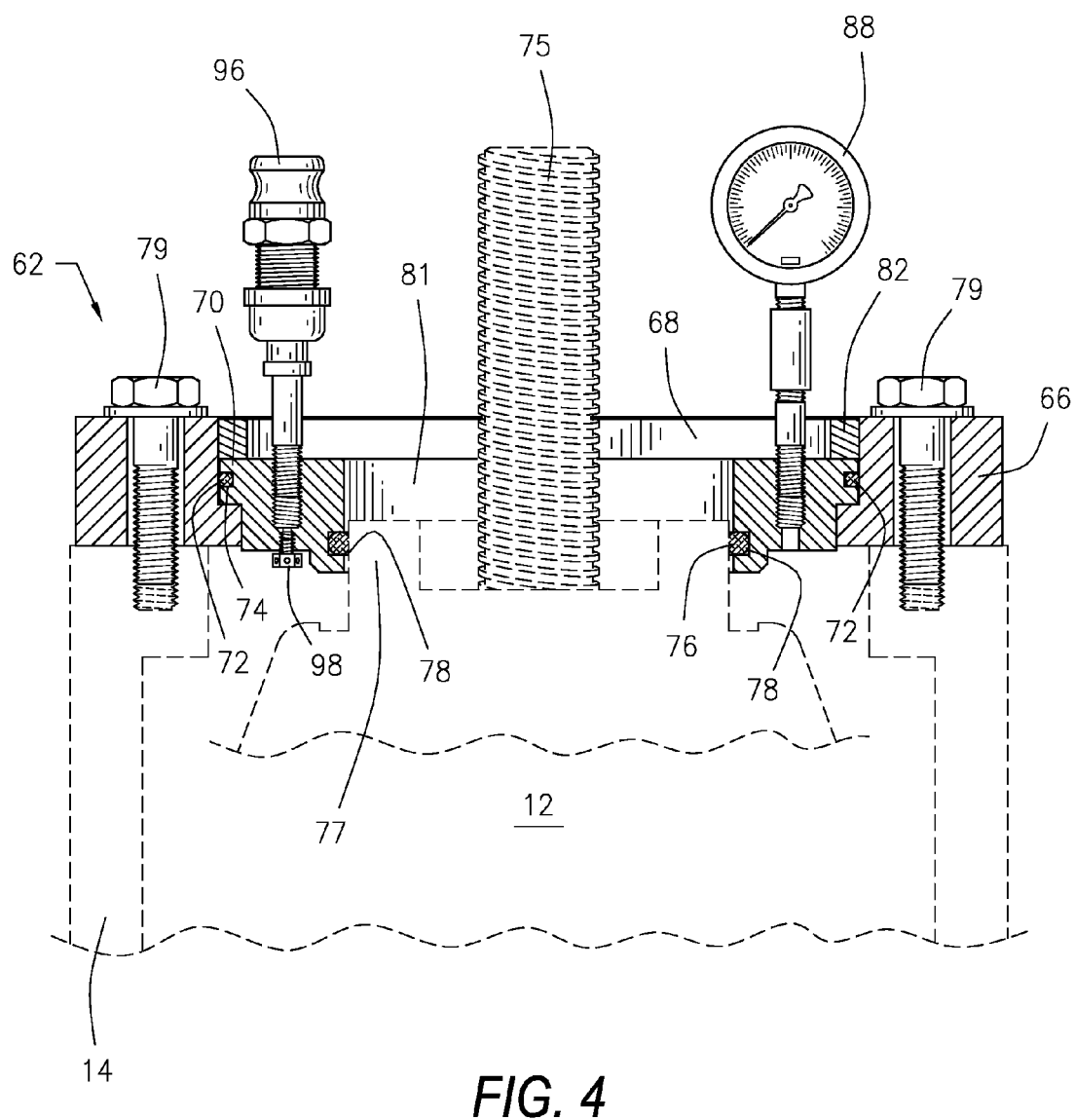
FIG. 4 is a cross-sectional view of the rotatable mounting assembly shown in FIG. 3.
Figure 5:
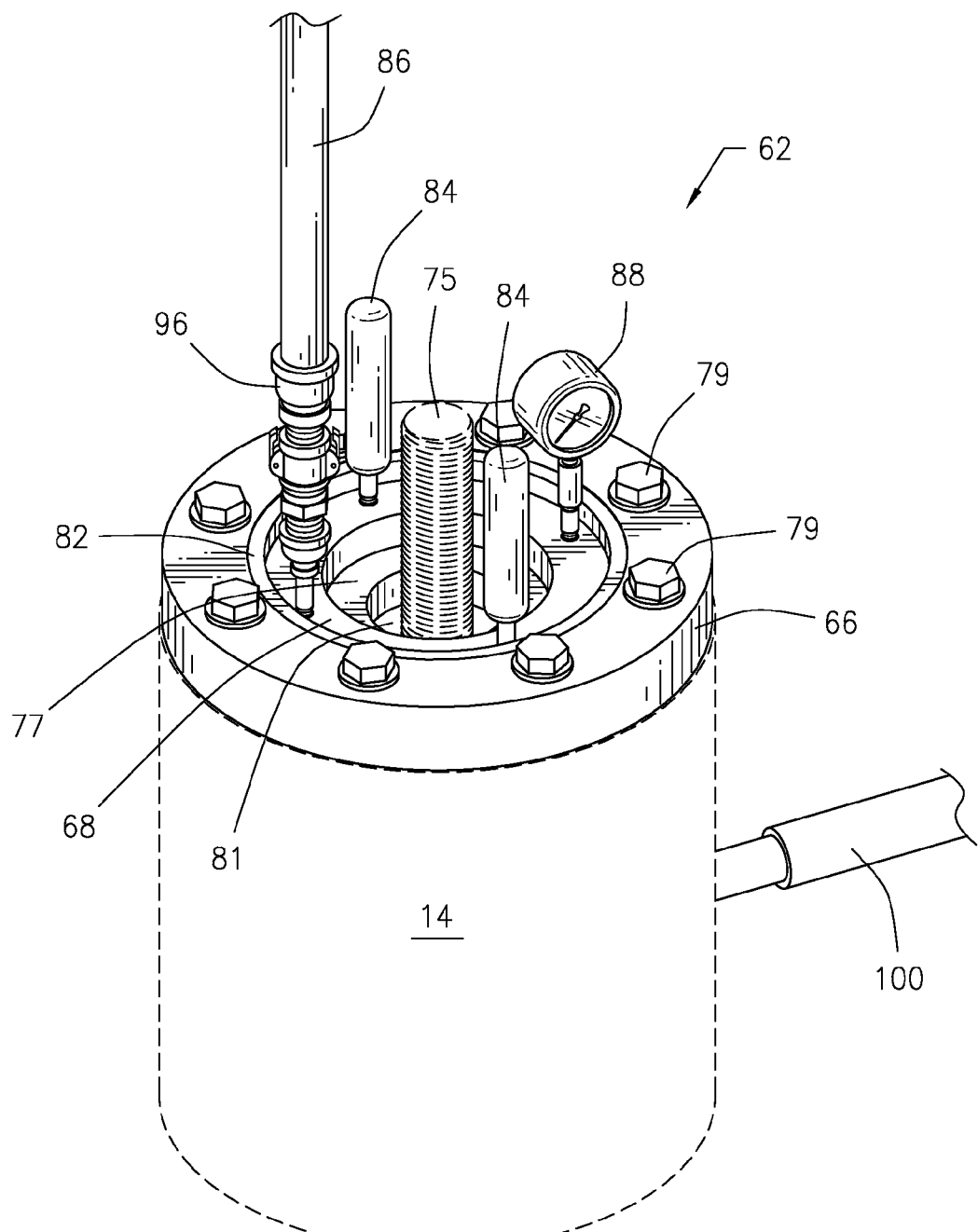
FIG. 5 is an exploded view of the rotatable mounting assembly shown in FIG. 3.

As noted above, the heated cleaning agent is injected at a high velocity to flush the hardened lubricant, contaminants and other debris from the gearbox 12. The system and process 10 can be directly connected to an inlet port (not shown) on the actuator 14, or as illustrated in FIGS. 3 through 5, the system and process 10 can include a rotatable mounting assembly 62 that is secured to the actuator 14 after a cover (not shown) of the gearbox 12 is removed. An actuator stem 75 of the actuator 16 extends through an actuating stem passage 81 of the rotatable mounting assembly 62. As exemplified, the rotatable mounting assembly 62 is constructed of a gearbox mounting plate 64 that is secured to the gearbox 12 using a plurality of fasteners 79. The mounting plate 64 includes a generally cylindrical internal sealing shoulder 66 defined within the rotatable mounting assembly 62.

The rotatable mounting assembly 62 also includes a rotating plate 68 in sealed engagement with the mounting plate 64 and the gearbox 12. The rotating plate rotates the pressure flow of the cleaning agent 360 degrees for flushing the enclosed gearbox 12 of the actuator 14. To obtain sealing between the rotating plate 68 and the mounting plate 64, the rotating plate 68 may include a circular, axially extending sealing projection 70, received within a cylindrical internal sealing surface 73 defined within the mounting plate 64 and sealed with respect to the mounting plate 64 by annular sealing elements or seal assemblies 72, which may be composed of elastomer and polymer materials capable of accomplishing effective sealing at normal operating temperatures and at all pressure ranges. The seal assemblies 72 can be carried within a circular seal groove 74 defined in the outer periphery of the axially extending circular sealing projection 68. The rotating plate 68 may also be provided with an internal circular sealing element or seal assemblies 76, which are located within a circular seal groove 78 on an internal sealing face 80 of the rotating plate 68 and which establish sealing engagement with a drive nut 77 of the gearbox 12.

The rotatable mounting assembly 62 may be further provided with a retainer element 82, which maintains sealing engagement between the rotating plate 68 and the mounting plate 64 during rotation of the rotating plate 68. The retainer element 82 also serves as a weather seal and prevents dirt and other debris from interfering with the rotatable mounting assembly 62.

The rotatable mounting assembly 62 may be further provided at least one handle 84 and a pressure gauge 88 for monitoring the operating pressure of the system and process 10 within the gearbox 12. The pressure gauge 88 is secured within a pressure flow port 90 of the rotating plate 68 of the rotatable mounting assembly 62. In addition, the rotating plate 68 includes an inlet flow port 92 having an inlet 94 secured thereto. An upper portion of the inlet 96 may be provided with an internal check valve and a quick connect fitting attachable to an input hose 86 that is in fluid communication with the midstream valve member of the system and process 10. A lower portion of the inlet 96 includes at least one nozzle 98, which can be fixed or configured to rotate at a predetermined rate of rotation, for injecting the cleaning agent pumped from the circulation tank 22 into the gearbox 12 at a high velocity to achieve a turbulent flow to remove old lubricant, contaminants and debris from the enclosed gearbox 12. An output hose 100 is in fluid communication with the effluent downstream member of the system and process 10 for pumping the cleaning agent, old lubricant, contaminants and debris from the enclosed gearbox 12 to the waste tank 18.

Whereas, the systems and processes have been described in relation to the drawings and claims, it should be understood that other and further modifications, apart from those shown or suggested herein, may be made within the scope of this invention.

What is claimed is:

1. A system for removing hardened lubricant from an enclosed gearbox of an actuator, said system comprising:
   a clean tank configured to store an influent of a cleaning agent, said clean tank positioned within an upstream flow path of said system;
   a waste tank configured to store an effluent of said cleaning agent, said waste tank positioned within a downstream flow path of said system;
   a circulation tank in fluid communication with said clean tank and said waste tank, said circulation tank positioned within a midstream flow path of said system, said circulation tank configured to heat said cleaning agent to a predetermined workable temperature;
   an upstream pump in fluid communication with said circulation tank, said upstream pump positioned within said midstream flow path of said system, said upstream pump configured to pump said heated cleaning agent from said circulation tank into said gearbox at a first predetermined pressure level;
   a downstream pump in fluid communication with said circulation tank, said downstream pump positioned within said midstream flow path of said system, said downstream pump configured to maintain pressure within said gearbox at a second predetermined pressure level, said second predetermined pressure level being less than said first predetermined pressure level, said downstream pump further configured to pump said cleaning agent from within said gearbox to said circulation tank; and
   a compressor in fluid communication with said clean tank, said waste tank and said circulation tank.

2. The system of claim 1 wherein said upstream pump is further configured to pump said heated cleaning agent into said gearbox at said first predetermined pressure level of not to exceed about forty pounds per square inch to achieve a turbulent flow to remove old lubricant, containments and/or debris from said gearbox.

3. The system of claim 2 wherein said upstream pump is an electrically powered centrifugal pump.

4. The system of claim 1 wherein downstream pump is configured to maintain said pressure within said gearbox between at said second predetermined pressure level of about one to about three pounds per square inch.

5. The system of claim 4 wherein said downstream pump is a pneumatic diaphragm pump.

6. The system of claim 1 further comprising a plurality of relief valves in fluid communication with said compressor.

7. The system of claim 1 further comprising an upstream valve member positioned within said upstream flow path of said system, and said upstream valve member in fluid communication with said clean tank and said circulation tank.

8. The system of claim 1 further comprising a midstream valve member positioned within said midstream flow path of said system, and said midstream valve member in fluid communication with said circulation tank.

9. The system of claim 1 further comprising a downstream valve member positioned within said downstream flow path of said system, and said downstream valve member in fluid communication with said waste tank.

10. The system of claim 1 wherein said clean tank and/or said waste tank include a liquid level tank gauge.

11. The system of claim 1 wherein said circulation tank includes at least one heating element to heat the cleaning agent to said predetermined workable temperature.

12. The system of claim 1 further comprising an input hose for fluidly connecting said circulating tank along said midstream flow path to said gearbox, and an output hose for fluidly connecting said gearbox to either said circulating tank along said midstream flow path or said waste tank along said downstream flow path.

13. The system of claim 1 further comprising a rotatable mounting assembly constructed to be secured to said gearbox of said actuator.

14. The system of claim 13 wherein said rotatable mounting assembly further comprises:
   a mounting plate constructed to be secured to said gearbox; and
   a rotating plate in sealed engagement with said mounting plate; said rotating plate constructed to be placed in sealed engagement with said gearbox.

15. The system of claim 14 wherein said rotatable mounting assembly further comprises:

said mounting plate comprising a generally cylindrical internal sealing shoulder and a cylindrical internal sealing surface; and said rotating plate comprising an annular sealing element positioned within a circular seal groove defined in an outer periphery of an axially extending circular sealing projection of said rotating plate;

wherein said rotating plate is sealed with respect to said mounting plate by said seal assembly of said rotating plate.

16. The system of claim 14 wherein said rotating plate further comprises an internal circular sealing element positioned within a circular seal groove on an internal sealing face of said rotating plate, and wherein said internal circular sealing element of said rotating plate is constructed to establish sealing engagement with a drive nut of said gearbox.

17. The system of claim 14 wherein said rotatable mounting assembly further comprises a retainer element for maintaining sealing engagement between said rotating plate and said mounting plate during rotation of said rotating plate.

18. The system of claim 14 wherein said rotating plate further comprises an inlet flow port in fluid communication with said circulating tank along said midstream flow path to said gearbox.

19. The system of claim 18 further comprising at least one nozzle in fluid communication with said inlet flow port for injecting said cleaning agent at a high velocity to achieve a turbulent flow within said gearbox.

20. The system of claim 1 wherein said downstream pump is in operable communication with said upstream pump.

* * * * *